US010681063B1

(12) United States Patent
Silva et al.

(10) Patent No.: US 10,681,063 B1
(45) Date of Patent: Jun. 9, 2020

(54) SECURING A NETWORK DEVICE FROM A MALICIOUS EMBEDDED SCRIPT HOSTED ON A THIRD-PARTY DOMAIN

(71) Applicant: SYMANTEC CORPORATION, Mountain View, CA (US)

(72) Inventors: David Luz Silva, Swords (IE); Petros Efstathopoulos, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 204 days.

(21) Appl. No.: 15/826,640

(22) Filed: Nov. 29, 2017

(51) Int. Cl.
*H04L 29/06* (2006.01)
*G06F 21/57* (2013.01)
*G06F 21/53* (2013.01)

(52) U.S. Cl.
CPC .......... *H04L 63/1416* (2013.01); *G06F 21/53* (2013.01); *G06F 21/577* (2013.01); *G06F 2221/034* (2013.01)

(58) Field of Classification Search
CPC ............. H04L 63/1408; H04L 63/1433; H04L 63/1483; H04L 67/02; H04L 63/14; H04L 67/20; H04L 63/145; H04L 63/1466; G06F 21/56; G06F 21/562; G06F 21/566; G06F 21/577; G06F 21/62; G06F 21/6263; G06F 2221/2149; G06F 21/51; G06F 21/6245; G06F 2221/2119; G06Q 10/0635; G06Q 30/02
See application file for complete search history.

(56) References Cited

U.S. PATENT DOCUMENTS

| | | | | |
|---|---|---|---|---|
| 8,250,657 B1* | 8/2012 | Nachenberg | .......... | G06F 21/577 705/50 |
| 9,912,767 B1* | 3/2018 | Weald | ..................... | H04L 67/42 |
| 2007/0206584 A1* | 9/2007 | Fulling | .................. | G06Q 30/02 370/356 |
| 2010/0106767 A1* | 4/2010 | Livshits | .................. | G06F 21/52 709/203 |

(Continued)

OTHER PUBLICATIONS

"Security: General bypass of SRI validation for subresources located on the same origin"; Web page; bugs, Project: chromium, Issues; Feb. 4, 2016; accessed on Nov. 29, 2017; located at: https://bugs.chromium.org/p/chromium/issues/detail?id=584155; 6 pages.

(Continued)

*Primary Examiner* — Abiy Getachew
(74) *Attorney, Agent, or Firm* — Maschoff Brennan (57) ABSTRACT

Securing a network device from a malicious embedded script hosted on a third-party domain. In one embodiment, a method may include detecting an attempt by a browser executing on a network device to load a webpage that embeds a reference to a script hosted on a third-party domain, compiling a list of domains that host webpages that embed references to the script hosted on the third-party domain, identifying reputation scores for the domains in the list of domains, generating a risk score for the script based on the identified reputation scores, determining that the script is malicious based on the generated risk score being above a threshold risk score, and, in response to determining that the script is malicious, performing a security action on the network device that secures the network device from the malicious script.

20 Claims, 4 Drawing Sheets

(56) References Cited

U.S. PATENT DOCUMENTS

2012/0317238 A1* 12/2012 Beard .................... H04L 63/10
  709/219
2014/0096229 A1* 4/2014 Burns ................ H04L 63/1491
  726/15

OTHER PUBLICATIONS

Observatory by Mozilla; "Frequently Asked Questions: General"; Web page; accessed on Nov. 29, 2017; located at: https://observatory.mozilla.org/faq.html; 6 pages.

Szathmari, Gabor; "About the Project"; sritestiobeta; Web page; 2016; accessed on Nov. 29, 2017; located at: https://sritest.io/about; 2 pages.

High-Tech Bridge SA: Web Security Company; "Web Server Security Test: About the Service"; 2007-2017; Web page; accessed on Nov. 29, 2017; located at: https://www.htbridge.com/websec/#about; 3 pages.

Weichselbaum, L. et al.; "CSP Is Dead, Long Live CSP! on the Insecurity of Whitelists and the Future of Content Security Policy"; Presented at Proceedings of the 23rd ACM Conference on Computer and Communications Security; 2016; 12 pages.

United States Patent Application filed on Jun. 14, 2016 titled "Systems and Methods for Determining the Risk Information Leaks From Cloud-Based Services"; 55 pages.

* cited by examiner

SECURING A NETWORK DEVICE FROM A MALICIOUS EMBEDDED SCRIPT HOSTED ON A THIRD-PARTY DOMAIN

BACKGROUND

A webpage is a document written in a standard markup language, such as Hypertext Markup Language (HTML), that is typically downloaded to a network device over the World Wide Web from a webserver. Once downloaded, the webpage is then displayed to a user of the network device in an application known as a web browser (or simply a "browser"). A static webpage is generally downloaded and displayed in the browser exactly as stored on the webserver. In contrast, a client-side dynamic webpage generally includes scripts embedded in the markup language of the webpage that are executed by the browser as the webpage loads in the browser.

Scripts may be embedded directly in the markup language of the webpage or may be embedded indirectly in the markup language of the webpage by embedding a reference to a separate script that is stored outside the webpage. For example, embedding a reference to a separate script in a webpage, instead of embedding the script itself, may allow the webpage to be smaller in size, may allow the separate script to be cached by the browser for future use, may make the source code of the webpage more readable, and may allow for the separate script to be updated and improved over time in a single location without requiring updates to any particular webpage that embeds a reference to the script.

One difficulty with embedding a reference to a separate script in a webpage is the security risks inherent in separate scripts. For example, where a separate script is controlled by a third-party, there is always a possibility that the separate script may be hacked or otherwise compromised such that the separate script becomes malicious. For example, a malicious script may be configured to capture confidential information without authorization, such as usernames, passwords, account numbers, and social security numbers. Thus, embedding a reference to a separate script controlled by a third-party in a webpage may result in the webpage inadvertently executing a malicious script once the webpage is loaded in a browser. Therefore, the benefits of embedding a reference in a webpage to a separate script controlled by a third-party may be outweighed by the security risks inherent in the use of the separate script.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securing a network device from a malicious embedded script hosted on a third-party domain may be performed, at least in part, by a computing device including at least one processor. The method may include detecting an attempt by a browser executing on a network device to load a webpage that embeds a reference to a script hosted on a third-party domain. The method may also include compiling a list of domains that host webpages that embed references to the script hosted on the third-party domain. The method may further include identifying reputation scores for the domains in the list of domains. The method may also include generating a risk score for the script based on the identified reputation scores. The method may further include determining that the script is malicious based on the generated risk score being above a threshold risk score. The method may also include, in response to determining that the script is malicious, performing a security action on the network device that secures the network device from the malicious script.

In some embodiments, the script hosted on the third-party domain may be a JavaScript script stored in a .js JavaScript file hosted on the third-party domain. In some embodiments, the webpage that embeds the reference to the script hosted on the third-party domain may be part of a web portal.

In some embodiments, the webpage that embeds the reference to the script hosted on the third-party domain may further embed additional scripts hosted on additional third-party domains. In these embodiments, the method may further include performing the compiling, identifying, generating, and determining for the additional scripts, and the securing of the network device from the malicious script may further include securing the network device from any of the additional scripts that are also determined to be malicious.

In some embodiments, the method may further include determining that the script includes suspicious functionality. In these embodiments, the suspicious functionality may include one or more of keyboard DOM event injection functionality, clipboard DOM event injection functionality, and additional outbound HTTP request functionality. In these embodiments, the generating of the risk score for the script may be further based on the script exhibiting the suspicious functionality when executed.

In some embodiments, the method may further include identifying a reputation score for the third-party domain. In these embodiments, the generating of the risk score for the script may further be based on the reputation score for the third-party domain.

In some embodiments, the performing of the security action on the network device may include one or more of preventing the browser executing on the network device from loading the webpage that embeds the reference to the malicious script, preventing the browser executing on the network device from executing the malicious script, and sandboxing the execution of the malicious script on the network device to analyze functionality of the malicious script prior to permitting the browser executing on the network device from executing the malicious script.

Also, in some embodiments, one or more non-transitory computer-readable media may include one or more computer-readable instructions that, when executed by one or more processors, cause the one or more processors to perform a method for securing a network device from a malicious embedded script hosted on a third-party domain.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

A webpage may embed a reference to a separate script that is stored outside the webpage. For example, a webpage may embed a reference to a JavaScript file (e.g., with a .js file extension, or other file extension that designates that the file is a JavaScript file) that stores a JavaScript script and that is hosted on a third-party domain. Embedding a reference in a webpage to a JavaScript file hosted on a third-party domain may allow the webpage to be smaller in size, may allow the JavaScript file to be cached by the browser for future use, may make the source code of the webpage more readable, and may allow for the JavaScript file to be updated and improved over time in a single location without requiring updates to any particular webpage that embeds a reference to the JavaScript file. Unfortunately, however, if a hacker hacks the third-party domain, the hacker may modify the JavaScript file in order to add malicious functionality to the JavaScript script stored therein. Malicious functionality may include, but is not limited to, functionality typical of a spyware, a virus, a worm, a logic bomb, a trapdoor, a Trojan horse, a Remote Admin Trojan (RAT), a malware, a mobile malicious code, a malicious font, and a rootkit, or some combination thereof. Alternatively, the JavaScript file may inadvertently develop malicious functionality due to becoming outdated and thereby not including current security updates. In either instance, a webpage that embeds a reference to the JavaScript file may become vulnerable to the malicious JavaScript script stored in the JavaScript file.

Some embodiments disclosed herein may secure a network device from a malicious embedded script hosted on a third-party domain. For example, where a webpage embeds a reference to a JavaScript file that is hosted on a third-party domain, a security application disclosed herein may detect an attempt by a browser executing on a network device to load the webpage, compile a list of domains that host webpages that embed references to the JavaScript file, identify reputation scores for the domains in the list of domains, generate a risk score for the JavaScript file based on the identified reputation scores, determine that the JavaScript script stored in the JavaScript file is malicious based on the generated risk score being above a threshold risk score, and, in response to determining that the JavaScript script stored in the JavaScript file is malicious, performing a security action on the network device that secures the network device from the malicious JavaScript script stored in the JavaScript file. In this manner, the security application disclosed herein may enable a webpage to reap the benefits of embedding references to separate scripts controlled by third-parties while safely handling the situation where any given separate script turns out to be malicious.

Figure 1:
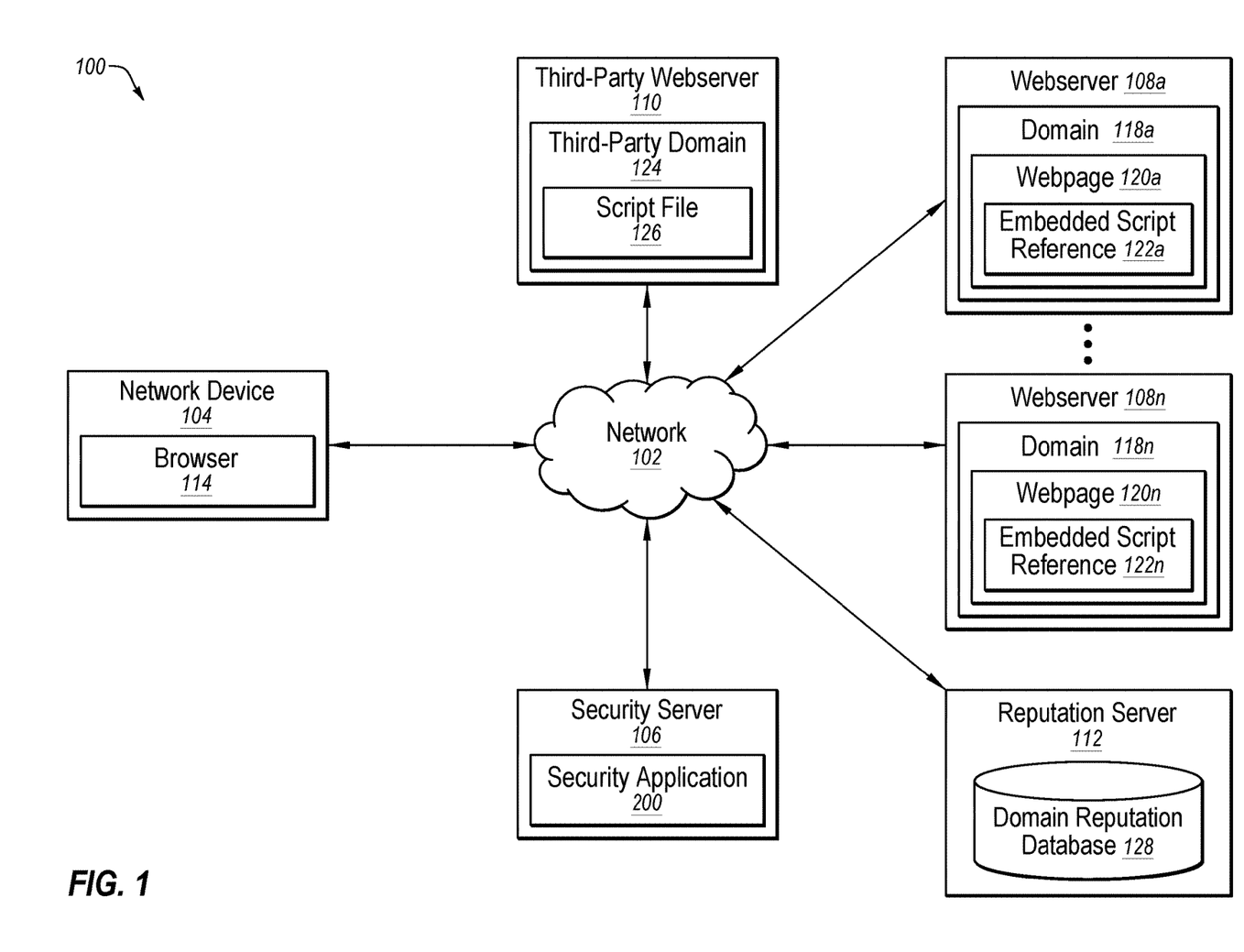
FIG. 1 illustrates an example system configured for securing a network device from a malicious embedded script hosted on a third-party domain.

Turning to the figures, FIG. 1 illustrates an example system 100 configured for securing a network device from a malicious embedded script hosted on a third-party domain. The system 100 may include a network 102, a network device 104, a security server 106, webservers 108a-108n, a third-party webserver 110, and a reputation server 112.

In some embodiments, the network 102 may be configured to communicatively couple the network device 104, the security server 106, the webservers 108a-108n, the third-party webserver 110, and the reputation server 112 to one another using one or more network protocols, such as the network protocols available in connection with the World Wide Web. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
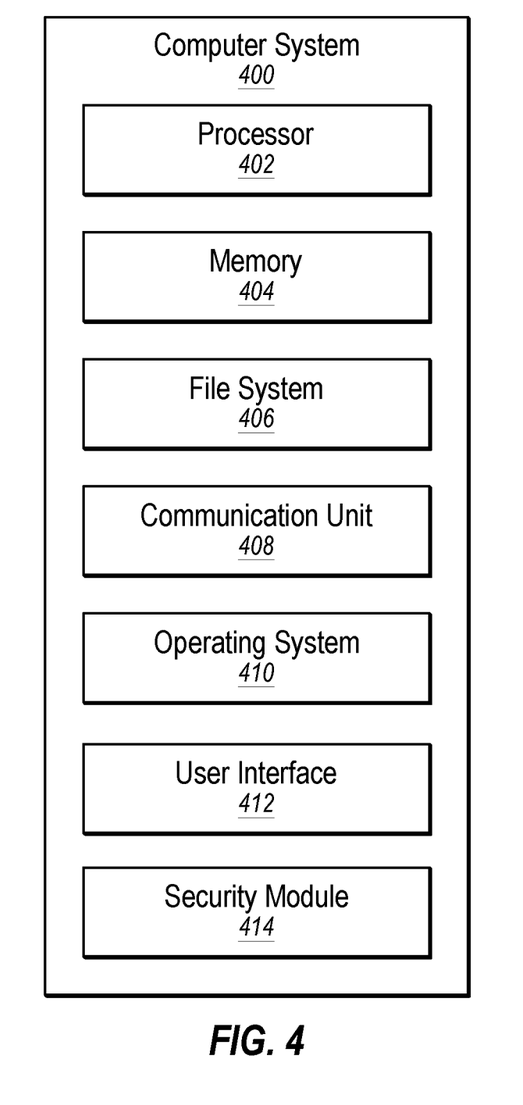
FIG. 4 illustrates an example computer system that may be employed in securing a network device from a malicious embedded script hosted on a third-party domain.

In some embodiments, the webservers 108a-108n, the third-party webserver 110, and the reputation server 112 may each be any computer system capable of communicating over the network 102 and capable of hosting webpages, other web documents such as script files, or web databases addressable at a particular web domain, examples of which are disclosed herein in connection with the computer system 400 of FIG. 4. The webservers 108a-108n may be addressable on domains 118a-118n and may host webpages 120a-120n, respectively. The webpages 120a-120n may include embedded script references 122a-122n. The embedded script references 122a-122n may be references to a script file 126 hosted on a third-party domain 124 of the third-party webserver 110, or another similar script file hosted on another third-party domain. In some embodiments, the script file 126 may have a non-portable executable (non-PE) file type. In some embodiments, the script file 126 may be a JavaScript file (a .js file). Alternatively, the script file 126 may be a script file having the format of another scripting language such as VBScript, AngularJS, JQuery, Bootstrap, AJAX, JScript, and ActionScript. The reputation server 112 may host a domain reputation database 128 that includes information regarding the reputation of various domains, such as the domains 118a-118n and the third-party domain 124. This reputation information may include a reputation score for each domain. This reputation score may take into account several security-related data points including, but not limited to, attack surface, sector, geolocation, incident history, and security hygiene. In some embodiments, the domain reputation database 128 may be a database provided by a domain reputation service such as Alexa or SimilarWeb.

In some embodiments, the network device 104 may be any computer system capable of communicating over the network 102 and executing a browser, examples of which are disclosed herein in connection with the computer system 400 of FIG. 4. The network device 104 may include a browser 114. The browser 114 may be configured to download, load, and display webpages, such as the webpages 120a-120n, to a user of the network device 104.

In some embodiments, the security server 106 may be any computer system capable of communicating over the network 102 and capable of monitoring the network device 104 in order to secure the network device 104 from a malicious embedded script hosted on a third-party domain, examples of which are disclosed herein in connection with the computer system 400 of FIG. 4. In some embodiments, the security server 106 may be employed by an organization that manages and/or protects the network 102 and/or the network device 104, and/or any of the webservers 108a-108n. In some embodiments, the security server 106 may include a security application 200. The security application 200 may be configured to secure the network device 104 from any malicious embedded script hosted on a third-party domain such as the third-party domain 124, as disclosed in greater detail in connection with FIGS. 2 and 3 herein. In some embodiments, the security application 200 may include, or be part of, a network security application, such as Symantec's Norton Safe Web application, Symantec's Content and Malware Analysis application, or Blue Coat's Content Analysis System (CAS) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
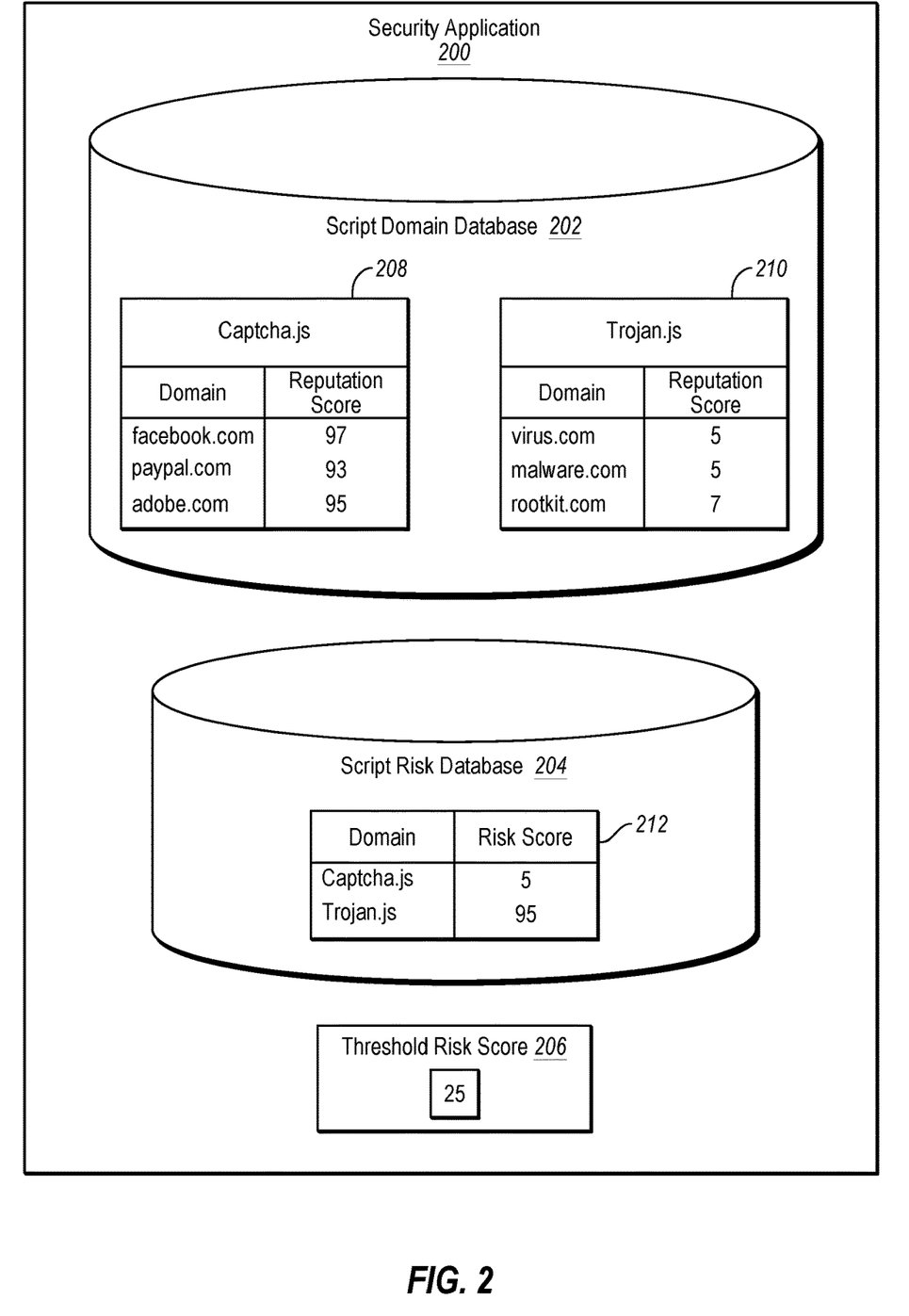
FIG. 2 illustrates an example security application that may be employed to secure a network device from a malicious embedded script hosted on a third-party domain.

FIG. 2 illustrates an example security application 200 that may be employed to secure a network device from a malicious embedded script hosted on a third-party domain. The security application 200 may be employed on the security server 106, as illustrated in FIG. 1, or may be employed on the network device 104, on the webservers 108a-108n, or on some combination thereof. The security application 200 will now be described in connection with FIGS. 1 and 2.

The security application 200 may include a script domain database 202, a script risk database 204, and a threshold risk score 206.

The script domain database 202 may include one or more tables that each list a particular script file hosted on a third-party domain, the domains that host webpages that embed references to the script file, and the reputation scores of those domains. In a first example, the script domain database 202 may include a table 208 that lists a particular script file named "Captcha.js" that may be hosted on the third-party domain 124 as the script file 126, the domains that host webpages that embed references to the script file 126 (namely, facebook.com, paypal.com, and adobe.com), and reputation scores of those domains (namely, 97, 93, and 95, respectively). In a second example, the script domain database 202 may include a table 210 that lists a particular script file named "Trojan.js" that may be hosted on the third-party domain 124 as the script file 126, the domains that host webpages that embed references to the script file 126 (namely, virus.com, malware.com, and rootkit.com), and reputation scores of those domains (namely, 3, 5, and 7, respectively). In either example, the list of domains that host webpages that embed references to the script file may be generated by crawling domains or by obtaining results from a previous crawl of domains. In either example, these domain reputation scores may be generated by the security application 200, based on its own assessment of their reputations, or may be obtained from the domain reputation database 128.

The script risk database 204 may include one or more tables, such as a table 212, that lists script files and risk scores for the script files. For example, the script risk database 204 may list the script file named "Captcha.js" with a risk score of 5 and may list the script file named Trojan.js with a risk score of 95. The security application 200 may generate the risk score for each script file listed in the table 212 of the script risk database 204 using the information stored in the script domain database 202. For example, the security application 200 may generate the risk score of 5 for the script file named "Captcha.js" by averaging the reputation scores of the domains listed in the table 208, and then subtracting that average from 100. In this example, since the domains hosting the script file named "Captcha.js" have relatively high reputation scores, the risk score generated for the script file named "Captcha.js" is relatively low. In another example, the security application 200 may generate the risk score of 95 for the script file named "Trojan.js" by averaging the reputation scores of the domains listed in the table 210 and subtracting that average from 100. In this example, since the domains hosting the script file named "Trojan.js" have relatively low reputation scores, the risk score generated for the script file named "Trojan.js" is relatively high.

The threshold risk score 206 may include one or more thresholds, such as the threshold of 25. The security application 200 may employ the threshold risk score 206 when determining whether a particular script file listed in the script risk database is malicious. For example, the security application 200 may employ the table 212 in the script risk database 204 as well as the threshold risk score 206 to determine whether the script file named "Captcha.js" is malicious based on whether the generated risk score of 5 is above the threshold of 25. Since it is not, the security application 200 may determine that the script file named "Captcha.js" is not malicious. In another example, the security application 200 may employ the table 212 in the script risk database 204 as well as the threshold risk score 206 to determine whether the script file named "Trojan.js" is malicious based on whether the generated risk score of 95 is above the threshold of 25. Since it is, the security application 200 may determine that the script file named "Trojan.js" is malicious.

Modifications, additions, or omissions may be made to the security application 200 of FIG. 2 without departing from the scope of the present disclosure. For example, although the security application 200 is disclosed herein as including the script domain database 202, the script risk database 204, and the threshold risk score 206, any of these components may instead be separate from the security application 200. For example, in some embodiments, the security application 200 may include additional components similar to the components illustrated in FIG. 2 that each may be configured similarly to the components illustrated in FIG. 2.

Figure 3:
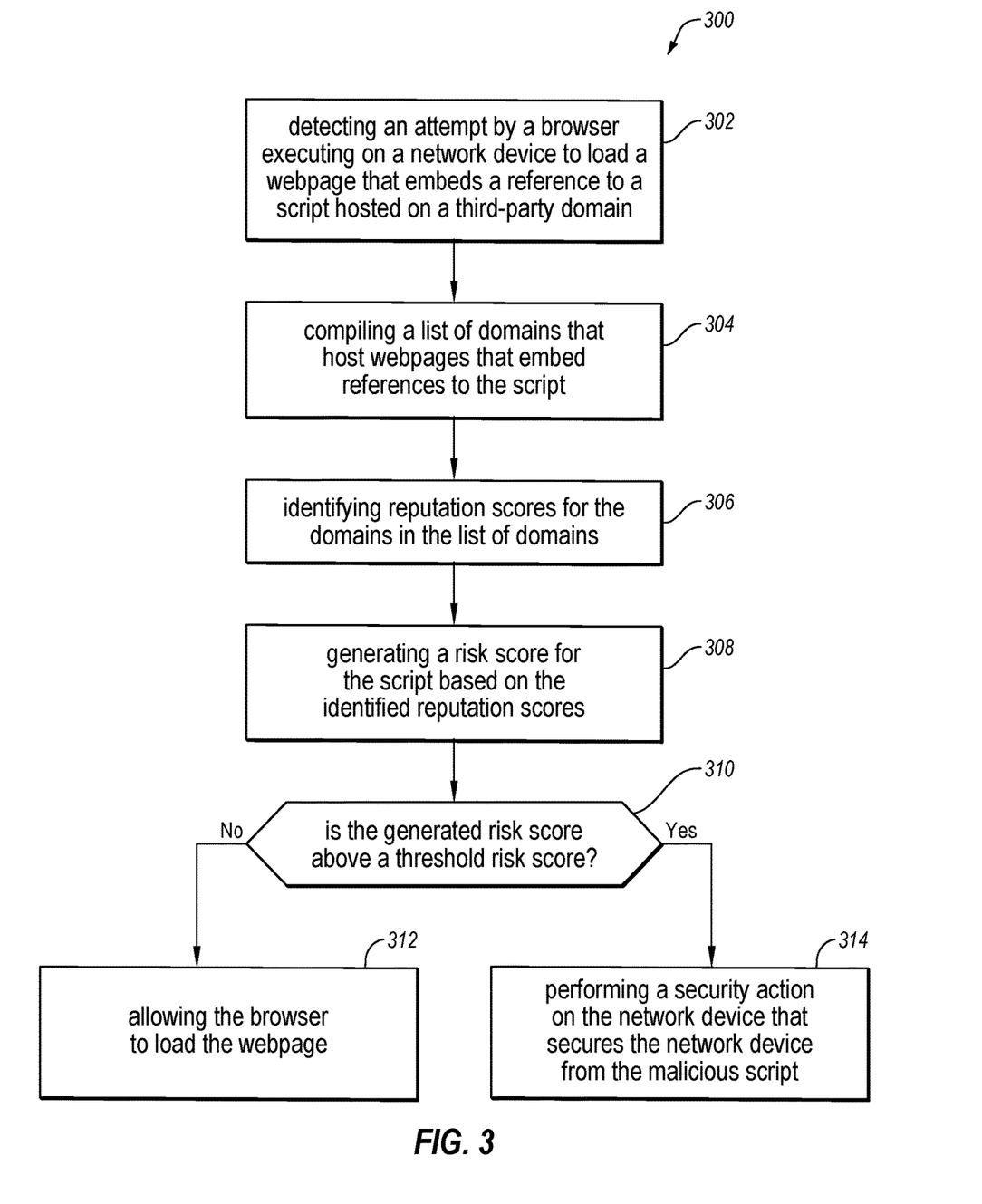
FIG. 3 is a flowchart of an example method for securing a network device from a malicious embedded script hosted on a third-party domain.

FIG. 3 is a flowchart of an example method 300 for securing a network device from a malicious embedded script hosted on a third-party domain. The method 300 may be performed, in some embodiments, by a device or system, such as by the security application 200 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, detecting an attempt by a browser executing on a network device to load a webpage that embeds a reference to a script hosted on a third-party domain. In some embodiments, the script hosted on the third-party domain may be a JavaScript script stored in a .js JavaScript file hosted on the third-party domain. In some embodiments, the webpage that embeds the reference to the script hosted on the third-party domain may be part of a web portal. A web portal may be a website that requires login credentials from a user prior to allowing access by a user, and may be especially susceptible to malicious scripts that function as keyloggers to nefariously capture the credentials entered by a user, then later use those credentials to launch an attack against the user and/or the web portal. Thus, a web portal may represent a "high value" target for purveyors of malicious scripts. For example, the security application 200 may detect, at action 302, an attempt by the browser 114 executing on the network device 104 to load a webpage 120*a* that includes an embedded script reference 122*a* to the script file 126 hosted on the third-party domain 124. In a first example, the embedded script reference 122*a* in the webpage 120*a* may be to the script file 126 with the name "Captcha.js." In a second example, the embedded script reference 122*a* in the webpage 120*a* may be to the script file 126 with the name "Trojan.js."

The method 300 may include, at action 304, compiling a list of domains that host webpages that embed references to the script. For example, the security application 200 may compile, at action 304, a list of domains that host webpages that embed references to the script using the script domain database 202. In the first example from above, the security application 200 may employ the table 208 of the script domain database 202 to compile the list of domains that host webpages that embed references to the script file named "Captcha.js." In the second example from above, the security application 200 may employ the table 210 of the script domain database 202 to compile the list of domains that host webpages that embed references to the script file named "Trojan.js."

The method 300 may include, at action 306, identifying reputation scores for the domains in the list of domains. For example, the security application 200 may identify, at action 306, reputation scores for the domains using the script domain database 202. In the first example from above, the security application 200 may employ the table 208 of the script domain database 202 to identify reputation scores for the domains in the list of domains corresponding to the script file named "Captcha.js." In the second example from above, the security application 200 may employ the table 210 of the script domain database 202 to identify reputation scores for the domains in the list of domains corresponding to the script file named "Trojanjs."

The method 300 may include, at action 308, generating a risk score for the script based on the identified reputation scores. For example, the security application 200 may generate, at action 308, a risk score for the script based on the identified reputation scores using the script domain database 202 and the script risk database 204. In the first example from above, the security application 200 may generate the risk score of 5 for the script file named "Captcha.js," as listed in the table 212 of the script risk database 204, by averaging the reputation scores of the domains listed in the table 208 and subtracting that average from 100. In this first example, since the domains hosting the script file named "Captcha.js" have relatively high reputation scores, the risk score generated for the script file named "Captcha.js" is relatively low. In the second example from above, the security application 200 may generate the risk score of 95 for the script file named "Trojan.js," as listed in the table 212 of the script risk database 204, by averaging the reputation scores of the domains listed in the table 210 and subtracting that average from 100. In this second example, since the domains hosting the script file named "Captcha.js" have relatively low reputation scores, the risk score generated for the script file named "Trojan.js" is relatively high.

In some embodiments, the generating of a risk score for a script at action 308 may further include determining whether the script includes suspicious functionality and then further basing the generation of the risk score at action 308 on whether the script exhibits the suspicious functionality. In these embodiments, the suspicious functionality may include one or more of keyboard DOM event injection functionality, clipboard DOM event injection functionality, and additional outbound HTTP request functionality. This suspicious functionality may be detected using heuristics to detect various suspicious functionalities. In the first example from above, the generation of the risk score for the script file named "Captcha.js," as listed in the table 212 of the script risk database 204, may further include the security application 200 safely executing the script file named "Captcha.js" in a "sandbox" or other safe computing environment and then further basing the generation of the risk score on whether the script file exhibited any suspicious functionality.

In some embodiments, the generating of a risk score for a script at action 308 may further include identifying a reputation score for the third-party domain and then further basing the generation of the risk score at action 308 on the reputation score for the third-party domain. In the second example from above, the generation of the risk score for the script file named "Trojan.js," as listed in the table 212 of the script risk database 204, may further include the security application 200 identifying a reputation score for the third-party domain 124, where the script file 126 is hosted, and then basing the generation of the risk score on this generated reputation score for the third-party domain 124.

The method 300 may include, at action 310, determining whether the generated risk score above is a threshold risk score. Depending on whether the generated risk score is above the threshold risk score, the script may be determined to be malicious. For example, the security application 200 may determine, at action 310, whether a generated risk score in the script risk database 204 is above the threshold risk score 206. In the first example from above, the security application 200 may determine that the generated risk score of 5 for the script file named "Captcha.js" in the table 212 of the script risk database 204 is not above the threshold risk score 206 of 25 (No at action 310) and therefore determine that the script file named "Captcha.js" is not malicious. In the second example from above, the security application 200 may determine that the generated risk score of 95 for the script file named "Trojan.js" in the table 212 of the script risk database 204 is above the threshold risk score 206 of 25 (Yes at action 310) and therefore determine that the script file named "Trojan.js" is malicious.

If the generated risk score is not above a threshold risk score (No at action 310), the method 300 may include, at action 312, allowing the browser to load the webpage. In the first example from above, the security application 200 may allow, at action 312, the browser 114 to load the webpage 120*a*. This action may be taken in response to the webpage 120*a* including the embedded script reference 122*a* to the script file 126 where the script file 126 is the script file named "Captcha.js" since this script file was determined at action 310 to not be malicious.

If the generated risk score is above a threshold risk score (Yes at action 310), the method 300 may include, at action 314, performing a security action on the network device that secures the network device from the malicious script. In some embodiments, the performing of the security action on the network device may include one or more of preventing the browser executing on the network device from loading the webpage that embeds the reference to the malicious script, preventing the browser executing on the network device from executing the malicious script, and sandboxing the execution of the malicious script on the network device to analyze functionality of the malicious script prior to permitting the browser executing on the network device from executing the malicious script. In the second example from above, the security application 200 may perform, at action 314, a security action on the network device 104 executing the browser 114 that secures the network device 104 from the malicious script. This security action may be performed on the network device 104 in response to the browser 114 attempting to load the webpage 120a that includes the embedded script reference 122a to the script file 126 where the script file 126 is the script file named "Trojan.js" since this script file was determined at action 310 to be malicious. The security action performed by the security application 200 may include, for example, preventing the browser 114 from loading the webpage 120a due to the malicious script file 126, preventing the browser 114 from executing the malicious script file 126, or sandboxing the execution of the malicious script file 126 on the network device 104 to analyze functionality of the malicious script file 126 prior to permitting the browser 114 from executing the malicious script file 126.

In some embodiments, the webpage that embeds the reference to the script hosted on the third-party domain may further embed additional scripts hosted on additional third-party domains. In these embodiments, the method 300 may further include performing the compiling at action 304, the identifying at action 306, the generating at action 308, and the determining at action 310 for the additional scripts, and the securing of the network device from the malicious script at action 314 may further include securing the network device from any of the additional scripts that are also determined to be malicious.

The method 300 may thus be employed, in some embodiments, to secure the network device 104 from a malicious embedded script file 126 hosted on the third-party domain 124. Some embodiments of the method 300 may enable the webpage 120a, which may be part of a web portal, to reap the benefits of having the embedded script reference 122a to the script file 126 controlled by the third-party webserver 110 while safely handling the situation where the script file 126 turns out to be malicious.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 304-310 may be employed without performing action 302 and action 312 or action 314. Also, in some embodiments, actions 302-310 may be employed without performing action 312 or action 314. Further, in some embodiments, actions 304-310 may be performed prior to performing the action 302 by saving the results of the action 310 for a simple lookup as to whether a script is malicious when the script is identified at action 302. Also, in some embodiments, any of actions 302, 312, and 314 may be performed by a network administrator or other entity that is different from the entity performing the other actions of the method 300.

Further, it is understood that the method 300 may improve the functioning of a network environment. For example, the functioning of any of the network device 104, the security server 106, and the webservers 108a-108n of FIG. 1 may itself be improved by the method 300. For example, any of these computer systems may be improved by detecting an attempt by a browser executing on a network device to load a webpage that embeds a reference to a script hosted on a third-party domain, determining if that script is malicious, and then, in response to determining that the script is malicious, performing a security action on the network device that secures the network device from the malicious script. The method 300 may thus result in the securing of the network device 104 from a malicious script and may enable the webservers 108a-108n, which may host webpages 120a-120n that are part of a web portal, to reap the benefits of having the embedded script references 122a-122n to the script file 126 controlled by the third-party webserver 110 while safely handling the situation where the script file 126 turns out to be malicious. The method 300 may be more effective than conventional methods which simply disallow embedded script references or allow embedded script references but fail to identify and perform security actions on scripts that turn out to be malicious.

Also, the method 300 may improve the technical field of securing network devices. Accurately identifying and securely dealing with malicious embedded scripts is an improvement over conventional methods which are unable to accurately identify or securely deal with a malicious embedded script due to failing to take into account the reputations of the domains that host webpages that embed references to the script.

FIG. 4 illustrates an example computer system 400 that may be employed in securing a network device from a malicious embedded script hosted on a third-party domain. In some embodiments, the computer system 400 may be part of any of the systems or devices described in this disclosure. For example, the computer system 400 may be part of any of the network device 104, the security server 106, the webservers 108a-108n, the third-party webserver 110, and the reputation server 112 of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the security module 414 may be part of the operating system 410 or may be part of an application of the computer system 400, or may be some combination thereof. In some embodiments, the security module 414 may function as the security application 200 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securing a network device from a malicious embedded script hosted on a third-party domain, at least a portion of the method being performed by a computing device comprising at least one processor, the method comprising:
   detecting an attempt by a browser executing on a network device to load a webpage that embeds a reference to a script hosted on a third-party domain;
   compiling a list of domains that host webpages that embed references to the script hosted on the third-party domain;
   identifying reputation scores for the domains in the list of domains;
   generating a risk score for the script based on the identified reputation scores;
   determining that the generated risk score is greater than a threshold risk score;
   in response to determining that the generated risk score is greater than the threshold risk score, determining that the script is malicious; and
   in response to determining that the script is malicious, performing a security action on the network device that secures the network device from the malicious script.

2. The method of claim 1, wherein the script hosted on the third-party domain is a JavaScript script stored in a JavaScript file hosted on the third-party domain.

3. The method of claim 1, wherein the webpage that embeds the reference to the script hosted on the third-party domain is part of a web portal.

4. The method of claim 1, wherein:
   the method further comprises determining that the script includes suspicious functionality; and
   the generating of the risk score for the script is further based on the script exhibiting the suspicious functionality when executed.

5. The method of claim 4, wherein the suspicious functionality comprises one or more of:
   keyboard Document Object Model (DOM) event injection functionality;
   clipboard DOM event injection functionality; and
   additional outbound HTTP request functionality.

6. The method of claim 1, wherein:
   the method further comprises identifying a reputation score for the third-party domain; and
   the generating of the risk score for the script is further based on the reputation score for the third-party domain.

7. The method of claim 1, wherein the performing of the security action on the network device comprises one or more of:
   preventing the browser executing on the network device from loading the webpage that embeds the reference to the malicious script;
   preventing the browser executing on the network device from executing the malicious script; and
   sandboxing the execution of the malicious script on the network device to analyze functionality of the malicious script prior to permitting the browser executing on the network device from executing the malicious script.

8. The method of claim 1, wherein:
   the webpage that embeds the reference to the script hosted on the third-party domain further embeds additional scripts hosted on additional third-party domains;
   the method further comprises performing the compiling, identifying, generating, and determining for the additional scripts; and
   the securing of the network device from the malicious script further comprises securing the network device from any of the additional scripts that are also determined to be malicious.

9. A computer-implemented method for securing a network device from a malicious embedded script hosted on a third-party domain, at least a portion of the method being performed by a computing device comprising at least one processor, the method comprising:
   detecting an attempt by a browser executing on a network device to load a webpage that is part of a web portal and that embeds a reference to a JavaScript script stored in a JavaScript file hosted on a third-party domain;
   compiling a list of domains that host webpages that embed references to the JavaScript script hosted on the third-party domain;

identifying reputation scores for the domains in the list of domains;

generating a risk score for the JavaScript script based on the identified reputation scores;

determining that the generated risk score is greater than a threshold risk score;

in response to determining that the generated risk score is greater than the threshold risk score, determining that the JavaScript script is malicious; and in response to determining that the JavaScript script is malicious, performing a security action on the network device that secures the network device from the malicious JavaScript script.

10. The method of claim 9, wherein:
the method further comprises determining that the JavaScript script includes suspicious functionality; and
the generating of the risk score for the JavaScript script is further based on the JavaScript script exhibiting the suspicious functionality when executed.

11. The method of claim 10, wherein the suspicious functionality comprises one or more of:
keyboard Document Object Model (DOM) event injection functionality;
clipboard DOM event injection functionality; and
additional outbound HTTP request functionality.

12. The method of claim 9, wherein:
the method further comprises identifying a reputation score for the third-party domain; and
the generating of the risk score for the JavaScript script is further based on the reputation score for the third-party domain.

13. The method of claim 9, wherein the performing of the security action on the network device comprises one or more of:
preventing the browser executing on the network device from loading the webpage that embeds the reference to the malicious JavaScript script;
preventing the browser executing on the network device from executing the malicious JavaScript script; and
sandboxing the execution of the malicious JavaScript script on the network device to analyze functionality of the malicious JavaScript script prior to permitting the browser executing on the network device from executing the malicious JavaScript script.

14. The method of claim 9, wherein:
the webpage that embeds the reference to the JavaScript script hosted on the third-party domain further embeds additional JavaScript scripts stored in additional JavaScript files hosted on additional third-party domains;
the method further comprises performing the compiling, identifying, generating, and determining for the additional JavaScript scripts; and
the securing of the network device from the malicious JavaScript script further comprises securing the network device from any of the additional JavaScript scripts that are also determined to be malicious.

15. One or more non-transitory computer-readable media comprising one or more computer-readable instructions that, when executed by one or more processors of one or more computing devices, cause the one or more computing devices to perform a method for securing a network device from a malicious embedded script hosted on a third-party domain the method comprising:
detecting an attempt by a browser executing on a network device to load a webpage that embeds a reference to a script hosted on a third-party domain;

compiling a list of domains that host webpages that embed references to the script hosted on the third-party domain;

identifying reputation scores for the domains in the list of domains;

generating a risk score for the script based on the identified reputation scores;

determining that the generated risk score is greater than a threshold risk score;

in response to determining that the generated risk score is greater than the threshold risk score, determining that the script is malicious; and in response to determining that the script is malicious, performing a security action on the network device that secures the network device from the malicious script.

16. The one or more non-transitory computer-readable media of claim 15, wherein:
the script hosted on the third-party domain is a JavaScript script stored in a JavaScript file hosted on the third-party domain; and
the webpage that embeds the reference to the script hosted on the third-party domain is part of a web portal.

17. The one or more non-transitory computer-readable media of claim 15, wherein:
the method further comprises determining that the script includes suspicious functionality;
the generating of the risk score for the script is further based on the script exhibiting the suspicious functionality when executed; and
the suspicious functionality comprises one or more of:
keyboard Document Object Model (DOM) event injection functionality;
clipboard DOM event injection functionality; and
additional outbound HTTP request functionality.

18. The one or more non-transitory computer-readable media of claim 15, wherein:
the method further comprises identifying a reputation score for the third-party domain; and
the generating of the risk score for the script is further based on the reputation score for the third-party domain.

19. The one or more non-transitory computer-readable media of claim 15, wherein the performing of the security action on the network device comprises one or more of:
preventing the browser executing on the network device from loading the webpage that embeds the reference to the malicious script;
preventing the browser executing on the network device from executing the malicious script; and
sandboxing the execution of the malicious script on the network device to analyze functionality of the malicious script prior to permitting the browser executing on the network device from executing the malicious script.

20. The one or more non-transitory computer-readable media of claim 15, wherein:
the webpage that embeds the reference to the script hosted on the third-party domain further embeds additional scripts hosted on additional third-party domains;
the method further comprises performing the compiling, identifying, generating, and determining for the additional scripts; and
the securing of the network device from the malicious script further comprises securing the network device from any of the additional scripts that are also determined to be malicious.

* * * * *